US009460731B2

(12) United States Patent
Hayakawa

(10) Patent No.: US 9,460,731 B2
(45) Date of Patent: Oct. 4, 2016

(54) NOISE ESTIMATION APPARATUS, NOISE ESTIMATION METHOD, AND NOISE ESTIMATION PROGRAM

(75) Inventor: Shoji Hayakawa, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 502 days.

(21) Appl. No.: 13/185,677

(22) Filed: Jul. 19, 2011

(65) Prior Publication Data

US 2012/0035920 A1 Feb. 9, 2012

(30) Foreign Application Priority Data

Aug. 4, 2010 (JP) ................................ 2010-175270

(51) Int. Cl.

*G10L 21/02* (2013.01)
*H04B 15/00* (2006.01)
*G10L 21/0208* (2013.01)
*G10L 25/06* (2013.01)
*G10L 25/18* (2013.01)
*G10L 21/0216* (2013.01)

(52) U.S. Cl.

CPC ............ *G10L 21/0208* (2013.01); *G10L 25/06* (2013.01); *G10L 25/18* (2013.01); *G10L 2021/02166* (2013.01)

(58) Field of Classification Search

CPC ........ G10L 21/02; G10L 19/00; G10L 15/20
USPC .......................................................... 704/226
See application file for complete search history.

(56) References Cited

U.S. PATENT DOCUMENTS 4,897,878 A 1/1990 Boll et al.
4,952,931 A * 8/1990 Serageldin ........... G08G 1/0965 340/901
5,579,435 A 11/1996 Jansson
5,706,395 A * 1/1998 Arslan ................ G10L 21/0208 704/226
5,749,068 A * 5/1998 Suzuki .................... G10L 15/20 704/226

(Continued)

FOREIGN PATENT DOCUMENTS

JP 61-194913 8/1986
JP 8-505715 6/1996

(Continued)

OTHER PUBLICATIONS

Japanese Office Action dated Feb. 4, 2014 in corresponding Japanese Application No. 2010-175270.

(Continued)

*Primary Examiner* — Timothy Nguyen
(74) *Attorney, Agent, or Firm* — Staas & Halsey LLP

(57) ABSTRACT

A noise estimation apparatus includes a correlation calculator configured to calculate a correlation value of a spectrum between a plurality of frames in sound information obtained using one or more microphones, a power calculator configured to calculate a power value indicating a sound level of one target frame among the plurality of frames, an update determiner configured to determine an update degree indicating a degree to which the sound information of the target frame is to be reflected in a noise model stored in a storage, or determine whether or not the noise model is to be updated to another noise model, based on the power value of the target frame and the correlation value, and an updater configured to generate the other noise model based on a determined result, the sound information of the target frame, and the noise model.

23 Claims, 8 Drawing Sheets

(56) References Cited

U.S. PATENT DOCUMENTS

| | | | | | |
|---|---|---|---|---|---|
| 5,839,101 | A * | 11/1998 | Vahatalo | G10L 21/0208 | 704/217 |
| 5,950,154 | A * | 9/1999 | Medaugh | G10L 21/02 | 704/226 |
| 6,772,126 | B1 * | 8/2004 | Simpson | G10L 19/24 | 704/222 |
| 8,229,740 | B2 * | 7/2012 | Nordholm | G10K 11/1786 | 381/313 |
| 8,462,962 | B2 * | 6/2013 | Itou | H04M 9/082 | 379/390.03 |
| 2004/0064314 | A1 * | 4/2004 | Aubert | G10L 25/87 | 704/233 |
| 2006/0015333 | A1 * | 1/2006 | Gao | G10L 25/48 | 704/233 |
| 2006/0053003 | A1 | 3/2006 | Suzuki et al. | | |
| 2006/0136203 | A1 * | 6/2006 | Ichikawa | G10L 21/0208 | 704/226 |
| 2006/0184363 | A1 * | 8/2006 | McCree | G10L 21/0208 | 704/233 |
| 2007/0156399 | A1 * | 7/2007 | Matsuo | G10L 21/0208 | 704/233 |
| 2008/0027716 | A1 * | 1/2008 | Rajendran | G10L 19/012 | 704/210 |
| 2008/0077403 | A1 * | 3/2008 | Hayakawa | G10L 15/20 | 704/233 |
| 2008/0317260 | A1 * | 12/2008 | Short | G10L 21/02 | 381/92 |
| 2010/0056063 | A1 * | 3/2010 | Sudo | G10L 21/0208 | 455/63.1 |
| 2010/0128896 | A1 * | 5/2010 | Hayakawa | H04R 3/005 | 381/92 |
| 2011/0286609 | A1 * | 11/2011 | Faller | H04R 3/005 | 381/92 |
| 2012/0197634 | A1 * | 8/2012 | Ishikawa | G10L 21/043 | 704/201 |

FOREIGN PATENT DOCUMENTS

| | | |
|---|---|---|
| JP | 10-097288 | 4/1998 |
| JP | 2004-240214 | 8/2004 |
| JP | 2005-037617 | 2/2005 |
| JP | 2005-156887 | 6/2005 |
| JP | 2006-163231 | 6/2006 |
| JP | 2007-183306 | 7/2007 |
| JP | 2008-187680 | 8/2008 |
| WO | WO 2004/111996 | 12/2004 |

OTHER PUBLICATIONS

Japanese Office Action dated Jan. 6, 2015 in corresponding Japanese Patent Application No. 2010-175270.

Japanese Office Action dated Sep. 1, 2015 in corresponding Japanese Patent Application No. 2010-175270, 4 pages.

* cited by examiner

NOISE ESTIMATION APPARATUS, NOISE ESTIMATION METHOD, AND NOISE ESTIMATION PROGRAM

CROSS-REFERENCE TO RELATED APPLICATIONS

This application is based upon and claims the benefit of priority of the prior Japanese Patent Application No. 2010-175270, filed on Aug. 4, 2010, the entire contents of which are incorporated herein by reference.

BACKGROUND

1. Field

The present embodiments relate to a technology that estimates a noise model for a sound obtained using a microphone.

2. Description of the Related Art

Hitherto, in order to perform a noise suppression process for suppressing noise of a sound signal received using a microphone; it has been determined whether or not a section for which a noise suppression process has been performed within the input sound signal is a voice section. Furthermore, it has been determined whether or not a section used for the target of a noise suppression process is stationary or non-stationary.

For example, Japanese Unexamined Patent Application Publication (Translation of PCT Application) No. 08-505715 discloses a method of determining whether a frame including a signal indicating a background sound is stationary or non-stationary. In the technology disclosed in Japanese Unexamined Patent Application Publication (Translation of PCT Application) No. 08-505715, the number of frames over which there is a continuous state in which the change in spectrum is small is measured, and a case in which the value thereof is greater than or equal to a threshold value is determined to be a stationary noise.

Furthermore, as a method for evaluating whether or not a section is a voice section, there is a method of using a correlation coefficient of a spectrum between adjacent frames as in, for example, International Publication 2004/111996. Furthermore, for example, Japanese Unexamined Patent Application Publication No. 2004-240214 discloses a technology using a correlation coefficient as a feature quantity of steadiness/unsteadiness for automatically making a determination regarding an acoustic signal.

Furthermore, as a noise suppression process of the related art, there is a spectral subtraction method. The spectral subtraction method is a method for suppressing noise by subtracting the value of a noise bias from a spectrum. For example, U.S. Pat. No. 4,897,878 relates to a spectrum subtraction method. The technology disclosed in Japanese Unexamined Patent Application Publication No. 2007-183306 corrects a spectrum after noise suppression to a target value when the target value of estimated noise is greater than a spectrum after noise suppression. Then, the technology disclosed in Japanese Unexamined Patent Application Publication No. 2007-183306 suppresses distortion of an output signal. As described above, in the noise suppression process, estimated values of noise are used for various applications.

SUMMARY

According to an aspect of the invention, a noise estimation apparatus includes a correlation calculator configured to calculate a correlation value of a spectrum between a plurality of frames in sound information obtained using one or more microphones, a power calculator configured to calculate a power value indicating a sound level of one target frame among the plurality of frames, an update determiner configured to determine an update degree indicating a degree to which the sound information of the target frame is to be reflected in a noise model recorded in a recording unit, or determine whether or not the noise model is to be updated to another noise model based on the power value of the target frame and the correlation value, and an updater configured to generate the other noise model based on a determined result by the update determiner, the sound information of the target frame, and the noise model.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DETAILED DESCRIPTION OF THE PREFERRED EMBODIMENTS

Figure 1:
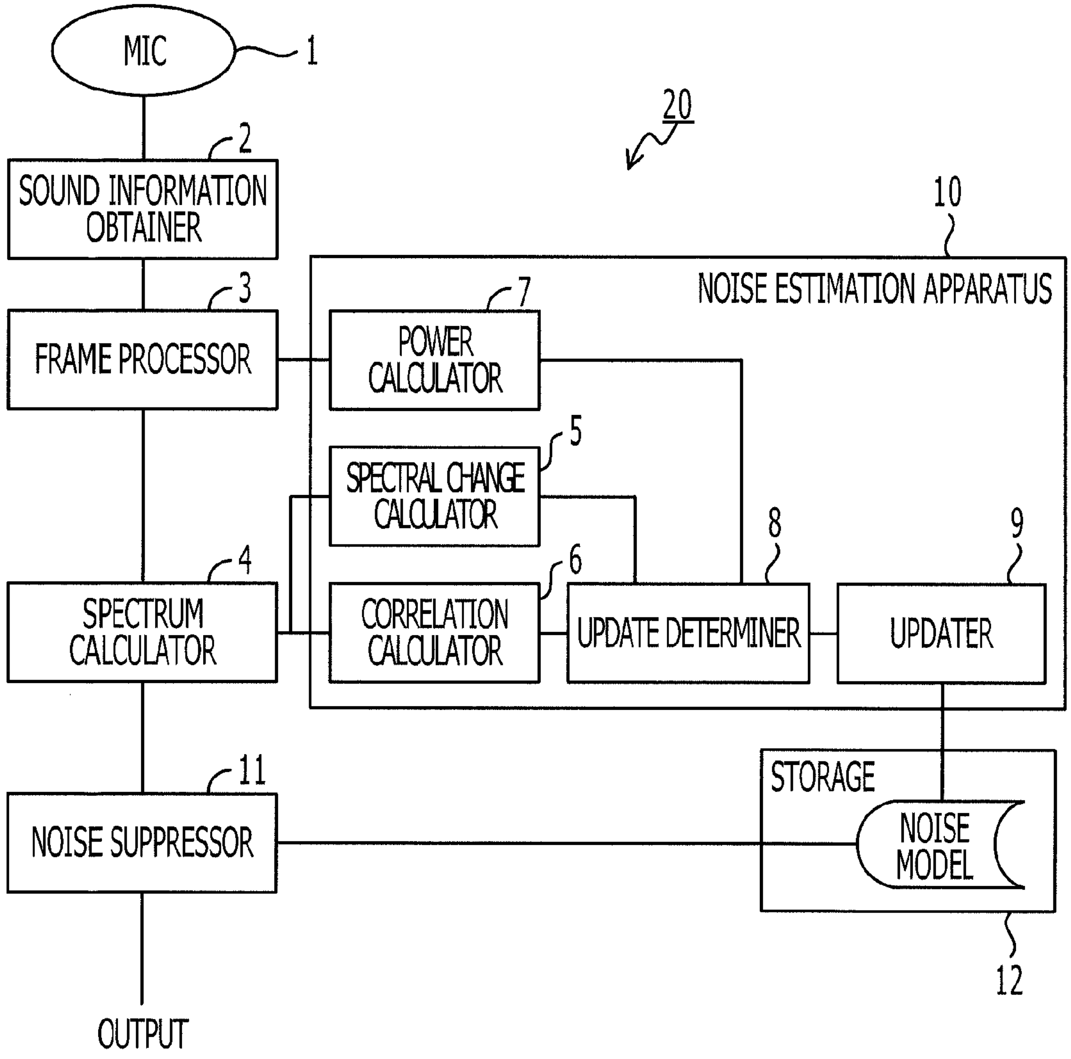
FIG. 1 is a functional block diagram illustrating the configuration of a noise suppression apparatus including a noise estimation apparatus according to a first embodiment of the present invention.

Reference may now be made in detail to embodiments of the present invention, examples of which are illustrated in the accompanying drawings, wherein like reference numerals refer to like elements throughout.

Hereinafter, data indicating an estimated noise will be referred to as a noise model. Here, in order to generate a noise model, use of sound information in a noise section within an input sound is effective. For this reason, a method is considered in which, for example, it is determined whether a section to be the target of processing in an input signal is stationary or non-stationary, or whether or not the section is a voice section, and a noise model is estimated based on the determination result and the input signal.

However, when there is a continuous plurality of vowel sections or sections in which talking is being done in a low power voice, in these sections, the power spectrum tends to be constant. In particular, in long vowel sections, this tendency is conspicuous. When the above-described technology of the related art is used, in a vowel section and a low power voice section, there is a probability that even a non-stationary noise will be determined to be a stationary noise. Therefore, by using the power spectrum in a vowel section and a low power voice section, the noise model is updated.

In addition, when a noise suppression process is performed using an updated noise model, in a noise suppression process using the related art, the suppression of an input sound is performed using a noise model in which sound components in the vowel section and the low power voice section are taken into consideration. Therefore, the inventors have proposed a technique of alleviating a sound section, such as a vowel section or a low power voice section, from being reflected in a noise model.

First Embodiment

Example of configuration of noise suppression apparatus 20

FIG. 1 is a functional block diagram illustrating the configuration of a noise suppression apparatus 20 including a noise estimation apparatus 10 according to a first embodiment of the present invention. The noise suppression apparatus 20 illustrated in FIG. 1 is an apparatus that obtains sound information from a microphone 1 and outputs a sound signal in which noise is suppressed. The noise suppression apparatus 20 may be provided in, for example, a portable phone set, a car navigation device having a voice input function. Apparatuses on which the noise estimation apparatus 10 or the noise suppression apparatus 20 is installed are not limited to the above-described examples, and may be provided in another apparatus having a function of receiving a sound from a user.

The noise suppression apparatus 20 includes sound information obtainer a sound information obtainer 2, a frame processor 3, a spectrum calculator 4, a noise estimation apparatus 10, a noise suppressor 11, and a storage 12.

The sound information obtainer 2 converts an analog signal received using the microphone 1 mounted in the housing into a digital signal. It is preferable that a low-pass filter (LPF) in accordance with a sampling frequency be applied to an analog sound signal before AD conversion. The LPF will be hereinafter referred to as an anti-aliasing filter. The sound information obtainer 2 may include an AD converter.

The frame processor 3 converts a digital signal into frames. As a result, a sound waveform represented by a digital signal is divided in units of a plurality of time series frames and cut out. The conversion-into-frame process is a process in which, for example, a section corresponding to a sample length is extracted and analyzed. Furthermore, the conversion-to-frame process may also be a process that is repeatedly performed while making extraction regions overlap by a fixed length. The sample length is called a frame length.

Furthermore, the fixed length is called a frame shift length. As an example, the frame length may be made to be approximately 20 to 30 ms, and the frame shift length may be made to be approximately 10 to 20 ms. The extracted frame is multiplied by a weight called an analysis window. As an analysis window, for example, a hanning window, a hamming window, or the like is used. The conversion-to-frame process is not limited to a specific process, and in addition, various techniques that are used in a field of speech signal processing and an acoustic signal processing may be used.

The spectrum calculator 4 calculates the spectrum of each frame by performing an FFT of each frame of a sound waveform. The spectrum calculator 4 may use a filter bank in place of an FFT, and may process waveforms of a plurality of bands obtained by the filter bank in a time domain. Furthermore, instead of an FFT, a conversion from another time domain into a frequency area may be used. For example, a wavelet transform may be used.

As described above, the sound information received by the microphone 1 is converted into a spectrum for each frame (for each analysis window) or waveform data by the sound information obtainer 2, the frame processor 3, and the spectrum calculator 4. Hereinafter, the noise estimation apparatus 10 uses the spectrum for each frame (for each analysis window) or waveform data. The noise estimation apparatus 10 receives the spectrum for each frame or the waveform data. Then, the noise estimation apparatus 10 updates the noise model recorded in a recording unit 12. As a result, the noise model is updated in accordance with the sound information obtained by the microphone 1.

The noise suppressor 11 performs a noise suppression process by using a noise model. The noise model is, for example, data indicating the estimated value of a noise spectrum. More specifically, the noise model may be made to be an average value regarding a spectrum of ambient noise having a small temporal change. The noise suppressor 11 subtracts the value of the spectrum of noise indicated by the noise model from the value of the spectrum of each frame calculated by the spectrum calculator 4.

With the subtraction process, it is possible for the noise suppressor 11 to calculate the spectrum from which noise components have been removed. It is preferable that the noise model does not have non-stationary noise having a large temporal change and voice information. With a noise suppression process using such a noise model, it is possible to output a sound signal in which stationary noise is suppressed. The noise suppression process using a noise model is not limited to the above-described example.

Example of Configuration of Noise Estimation Apparatus 10

The noise estimation apparatus 10 includes a spectral change calculator 5, a correlation calculator 6, a power calculator 7, an update determiner 8, and an updater 9.

The spectral change calculator 5 calculates a temporal change of the spectrum in at least a portion of the section in the sound obtained by the microphone 1. The spectral change calculator 5 converts, for example, the complex spectrum of each frame, which is obtained in the spectrum calculator 4, into a power spectrum. Then, the spectral change calculator 5 calculates the difference between the power spectrum of the previous frame and the power spectrum of the current frame. For example, the spectral change calculator 5 calculates the difference between the power spectrum that has been stored one frame before and the power spectrum of the current frame. As a result, it is possible for the spectral change calculator 5 to calculate a change in the power spectrum between frames.

Based on the temporal change in the spectrum calculated by the spectral change calculator 5, the update determiner 8 determines whether or not an update of reflecting the sound signal of the current frame in the noise model is to be performed. For example, when it is determined that the spectrum of the current frame has changed by an amount of a certain value or more compared to the spectrum of the previous frame, the update determiner 8 determines that the information of the current frame is not to be reflected in the noise model.

The correlation calculator 6 calculates a correlation value of the spectrum between a plurality of frames with respect to the sound signal obtained by one or more microphones. The correlation value is a value indicating the degree of the correlation of the spectrum between frames. For example, the correlation calculator 6 calculates the correlation coefficient of the spectrum between frames that are close to each other with respect to time as a correlation value. The correlation value is not limited to a correlation coefficient between adjacent frames, and may be, for example, the sum or a representative value (for example, an average value) of the correlation coefficients over a plurality of frames.

The power calculator 7 calculates a power value indicating the sound level of at least one target frame. As a result, the power value of the current frame is obtained. The power value of a frame may be obtained by using, for example, the amplitude of the time series waveform of the sound in the frame. For example, the power calculator 7 calculates the sum of squares of the sample values in the frame as the power value. Furthermore, the power calculator 7 may calculate the power value of the frame by using, for example, the spectrum calculated by the spectrum calculator 4.

The update determiner 8 determines whether or not the update of the noise model recorded in the recording unit 12 is performed by using the power value of the target frame and the correlation value between frames including the target frame. In addition, the update determiner 8 determines the update degree indicating the degree to which the target frame is to be reflected in the recorded noise model in the update. The update degree is a value indicating, for example, an update speed. The value indicating the update speed may be represented by a time constant. The updater 9 causes the sound information obtained from the microphone to be reflected in the noise model in accordance with the determination made by the update determiner 8.

As described above, since the update determiner 8 uses the power value of the target frame and the correlation value between frames including the target frame, the update determiner 8 appropriately determines the likelihood of a section of the target frame being a vowel section. Therefore, it is possible for the update determiner 8 to appropriately control the update degree, or the presence or absence of the updating in response to the likelihood of the vowel section of the target frame. That is, it is possible to alleviate the sound information of a vowel section and a low power voice section from being used by mistake for the update of the noise model.

As a result, in the noise estimation apparatus 10, the inclusion of a vowel section and components of a low power voice in the noise model, which is data indicating the estimated noise, is alleviated In particular, usually, when a noise model is used as a stationary noise model, there is a high probability that a vowel section and a low voice section will be determined to be a stationary noise section by mistake and is used for the update of the stationary noise model. However, the noise estimation apparatus 10 of the present first embodiment alleviates the reflection of the sound information of the vowel section and the low power voice section in the stationary noise model.

In the above-described configuration, it is possible for the update determiner 8 to determine whether or not the update of the noise model is performed by comparing the correlation value with a threshold value. Then, this threshold value may be determined in accordance with the power value of the target frame calculated by the power calculator 7. Specifically, it is possible for the update determiner 8 to control a parameter for a process for determining whether or not the update of the noise model is performed using the correlation value in accordance with the value of the current frame power.

As a result, for example, in each of the case of a low frame power time in which power is smaller than a certain value and the case of a high frame power time in which power is greater than a certain value, the update determiner 8 may set an appropriate threshold value for making a judgment as to whether to update the noise model. A time of low frame power is, for example, a section of a quiet environment or a section in which a speaker is talking in a low power voice. A time of a high frame power is, for example, a noise environment or a section in which a speaker is talking at an ordinary sound volume.

As described above, by controlling the threshold value by using the absolute magnitude of the power value of the frame by using the update determiner 8, a stabilized noise model estimation becomes possible when compared to the case in which the update of the noise model is controlled by using an estimated value, such as a stationary noise level or SNR. That is, it is possible for the noise estimation apparatus 10 to stably estimate an appropriate noise model.

Furthermore, the update determiner 8 may determine the update degree of the noise model in response to the power value of the target frame. Specifically, the update determiner 8 is able to control the value indicating the update speed of the noise model in accordance with the power value of the current frame calculated by the power calculator 7.

By controlling the update degree by using the absolute magnitude of the power value of the frame by the update determiner 8, the noise estimation apparatus 10 becomes able to estimate a stabilized noise model. For example, in each of the case of a low frame power time and the case of a high frame power time, the update of a noise model becomes possible at a value indicating an appropriate update degree. As a result, the noise estimation apparatus 10 becomes able to stably estimate the noise model.

Example of Operation of Noise Estimation Apparatus 10

Figure 2:
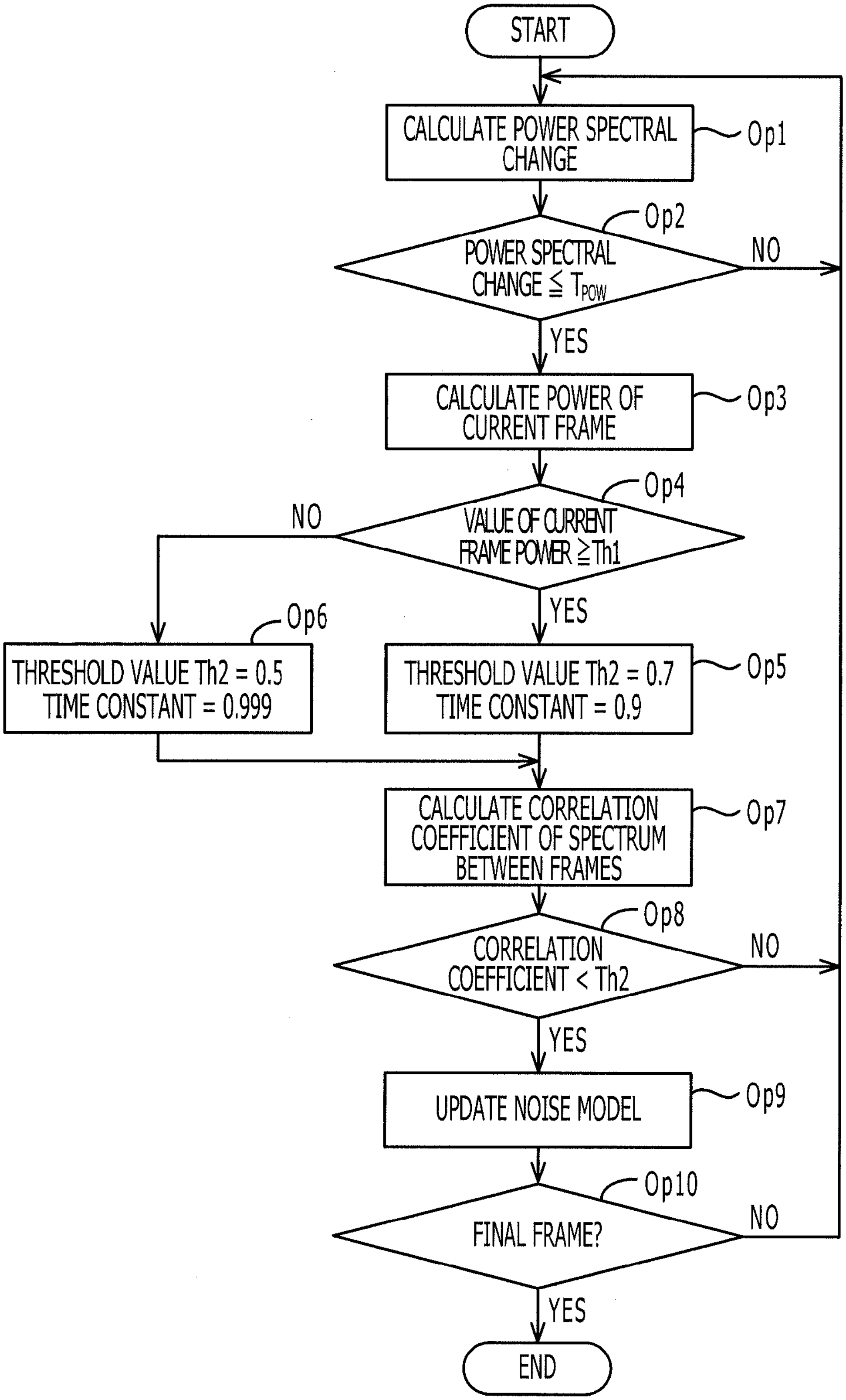
FIG. 2 is a flowchart illustrating an example of the operation of a noise estimation apparatus.

FIG. 2 is a flowchart illustrating an example of the operation of the noise estimation apparatus 10. The example illustrated in FIG. 2 is an example of a process in which the noise estimation apparatus 10 receives a frame-by-frame spectrum of the sound information received using the microphone 1 from the spectrum calculator 4, and a noise model.

First, the spectral change calculator 5 calculates a change in a power spectrum (Op1). The change in a power spectrum is a difference between the power spectrum of the previous frame and the power spectrum of the current frame. When the power spectral change is smaller than or equal to a threshold value TPOW (Yes in Op2), the noise estimation apparatus 10 performs a process (Op3 to Op9) for updating the noise model by using the power spectrum of the current frame. This is because if the power spectral change is smaller than or equal to the threshold value TPOW, the current frame is determined to have a probability of being a stationary noise.

In Op2, for example, sound having a small spectral change like a long vowel or a low power voice has a probability of being determined to be a stationary noise. However, in subsequent processes Op3 to Op8, the noise estimation apparatus 10 performs control so that the sound information of a frame having a small spectral change like a long vowel or a low power voice is not used to update the noise model.

On the other hand, when the power spectral change exceeds the threshold value TPOW (No in Op2), the spectral change calculator 5 performs control so that the power spectrum of the current frame is not used to update the noise model. That is, the subsequent processing is not performed, and the spectral change calculator 5 causes the process to return to Opt. When the power spectral change exceeds the threshold value TPOW, that is, when the change in the spectrum from the previous frame to the current frame is large, the current frame is determined to be not a stationary noise.

When Yes in Op2, the power calculator 7 calculates the power value of the current frame (Op3). The power value of the current frame is a value indicating the level of the input sound. For example, the power calculator 7 calculates the power value by using the waveform of the current frame that has been cut out by the frame processor 3. For example, the power calculator 7 obtains the power of the current frame in accordance with Expression (1) below by setting N samples in the frame as x(n).

Equation 1

$$\text{Frame power} = 10\cdot\log_{10}\sum_{i=1}^{N} x^2(i)[\text{dB}] \tag{1}$$

In the expression above, for example, if the sampling rate is 8 kHz and the frame length is 32 ms, the value of N is 256. The reason why a conversion is made in a dB unit is for the purpose of facilitating the adjustment of the threshold value for making a judgment as to whether the current frame is at low frame power or high frame power.

The update determiner 8 determines whether or not the power value of the current frame calculated by the power calculator 7 is smaller than a threshold value Th1 (Op4). The threshold value Th1 is an example of a threshold value for making a judgment as to whether the current frame is at low frame power or high frame power. The threshold value Th1 is stored in advance in the storage 12. For example, the threshold value Th1 may be set to 50 dBA (the frame power value when the noise level is “A” weighted sound pressure level).

The update determiner 8 controls parameters in the noise model updating process by using the power value of the current frame. The term “parameter” refers to a parameter for controlling the threshold value for determining whether or not the update of the noise model is performed and the update degree. The parameter for controlling the update degree will be referred to as a time constant.

Table 1 illustrated below is an example of parameter values in the noise model updating process. The time of low frame power is a case in which the power value of the current frame is smaller than the threshold value Th1, and the time of high frame power is a case in which the power value of the current frame is greater than or equal to the threshold value Th1. A threshold value Th2 of the correlation coefficient is an example of a threshold value for determining whether or not the section is a vowel section by using the correlation coefficient between the immediately previous frame and the current frame and by determining whether or not the update of the noise model is performed. The time constant is an example of a value indicating the update speed of the noise model.

TABLE 1

| | Threshold value Th2 of correlation coefficient | Time constant |
|---|---|---|
| At the time of low frame power | 0.5 | 0.999 |
| At the time of high frame power | 0.7 | 0.9 |

At the time of the low frame power, the correlation coefficient of the noise section and the correlation coefficient of the low power voice section tend to be small. Therefore, as in the example of Table 1 above, it is preferable that the threshold value Th2 be set small when compared to that at the time of the high frame power. Conversely, at the time of the high frame power, the correlation coefficient of the noise section tends to be large. Therefore, it is preferable that the threshold value be set larger than that at the time of the low frame power. The threshold value Th2 is recorded in advance in the storage 12.

Furthermore, at the time of the low frame power, the section is estimated to be a quiet environment in which the level of the stationary noise is small. Therefore, when the sound section is updated by mistake as a stationary noise section in such an environment, the ratio of sound components that are used for an update, which occupies in the estimated value of the noise model, becomes large. As a result, suppression is performed using a noise model in which sound is regarded as a stationary noise, and the distortion of the processed sound after noise suppression is increased.

Accordingly, as in the example of Table 1 above, the noise estimation apparatus 10 increases the time constant of the update of the noise model at the time of the low frame power time so as to slow the update. As a result of increasing the constant, even if the sound is determined by mistake as a stationary noise section, the ratio of the sound occupying the estimated value of the noise model is decreased. As a result, it is possible to alleviate adverse influence of the sound distortion. The time constant may be set based on a preparatory experiment. The closer to 1 the time constant is, the slower the update speed becomes.

In the example illustrated in FIG. 2, when it is determined in Op4 that the current frame power is greater than or equal to the threshold value Th1, the update determiner 8 performs the setting: Th2=0.7 and time constant=0.9 (Op5). The case in which the current frame power is greater than or equal to the threshold value Th1 is a case in which the current frame is determined to be a high frame power section. When the current frame is determined to be a low frame power section (No in Op4), the update determiner 8 performs setting: Th2=0.5, and time constant=0.999 (Op6). For the case in which the time constant at a normal time is set to 0.9, an update speed slower than that at a normal time is used for the case in which the current frame is determined to be a low frame power section (No in Op4).

In the present embodiment, the setting of a parameter for updating a noise model, which corresponds to the current frame power, is performed. The method of controlling a noise model update is not limited to this. For example, data or a function for associating the value of the current frame power with the set of correlation coefficients and time constants is recorded in the storage 12. Then, the update determiner 8 may determine a parameter corresponding to the current frame power by referring to the storage 12 or by performing a function process. Furthermore, in the evaluation of the power value of the current frame, the threshold value Th1 is not limited to one threshold value. For example, the threshold value may be classified for frame power sections of three or more stages by using two or more threshold values.

Next, the correlation calculator 6 calculates a correlation coefficient of a spectrum between the immediately previous frame and the current frame (Op7). Then, the update determiner 8 determines the section to be a vowel section if the threshold value is exceeded and determines the section to be a stationary noise section if the correlation coefficient falls below the threshold value (Op8). The correlation coefficient is calculated, for example, in accordance with Expression (2) below.

Equation 2

$$\text{Correlation coefficient} = \frac{\sum_{\omega=f_{low}}^{f_{high}} \{(S_{pre}(\omega) - m_{pre}) \cdot (S_{now}(\omega) - m_{now})\}}{\sqrt{\sum_{\omega=f_{low}}^{f_{high}} (S_{pre}(\omega) - m_{pre})^2 \cdot \sum_{\omega=f_{low}}^{f_{high}} (S_{now}(\omega) - m_{now})^2}} \tag{2}$$

$$m_{pre} = \frac{1}{f_{high} - f_{low} + 1} \sum_{\omega=f_{low}}^{f_{high}} S_{pre}(\omega)$$

Average value of power spectrum of immediately previous frame $$m_{now} = \frac{1}{f_{high} - f_{low} + 1} \sum_{\omega=f_{low}}^{f_{high}} S_{now}(\omega)$$

Average value of power spectrum of current frame $S_{pre}$ (ω): Power spectrum of immediately previous frame $S_{now}$ (ω): Power spectrum of current frame $f_{low}$: Lower limit frequency at which correlation coefficient is calculated $f_{high}$: Upper limit frequency at which correlation coefficient is calculated In the above-described example, the correlation coefficient takes a value from −1 to 1. This means that the closer to 1 the absolute value of the correlation coefficient, the higher is the correlation, and the closer to 0, the smaller is the correlation.

Figure 3A:
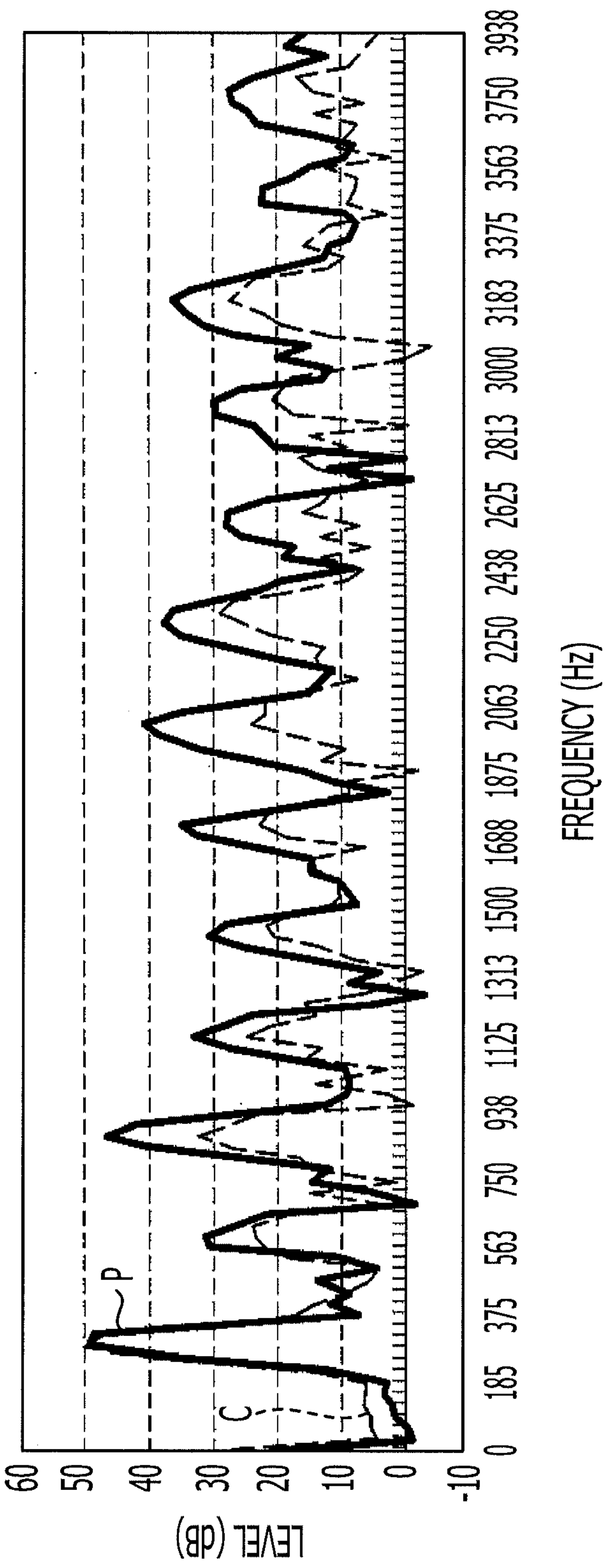
FIG. 3A illustrates an example of spectra of two consecutive frames in a vowel section.
Figure 3B:
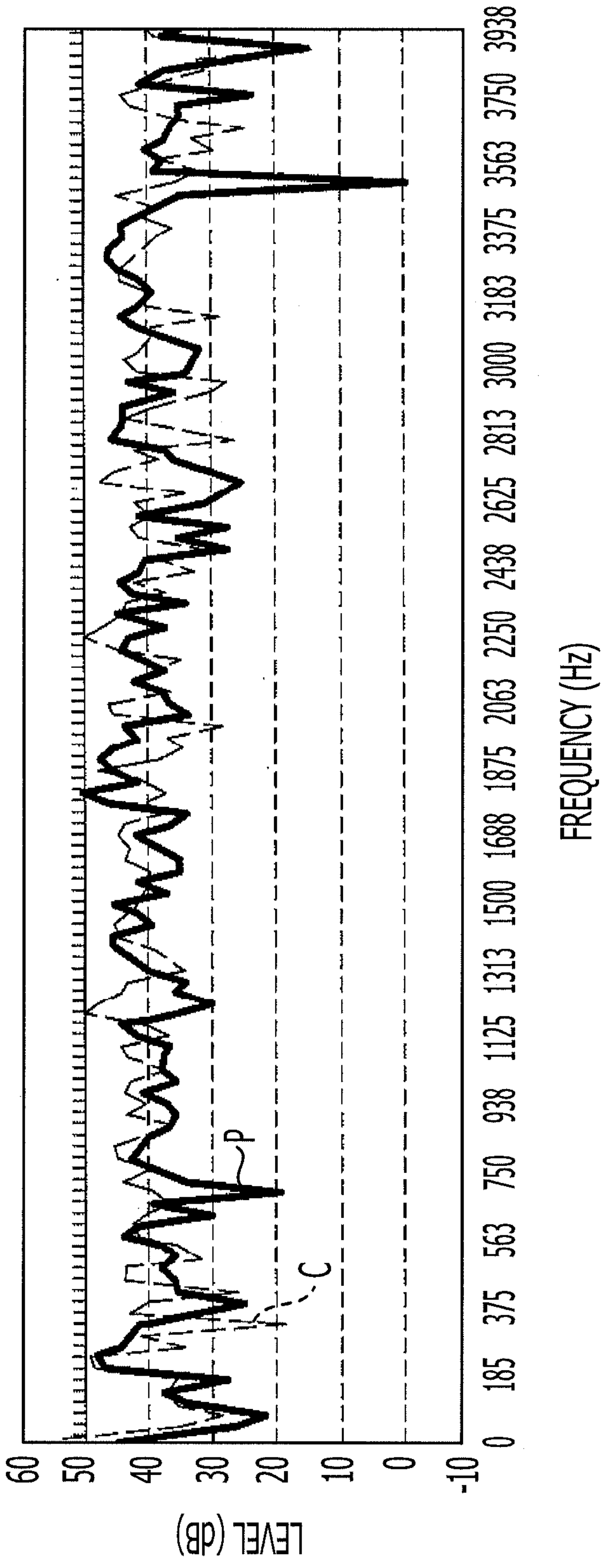
FIG. 3B illustrates an example of spectra of two consecutive frames in a stationary noise section.

FIG. 3A illustrates an example of spectra of two frames that are consecutive in the vowel section. FIG. 3B illustrates an example of spectra of two frames that are consecutive in a stationary noise section. In FIGS. 3A and 3B, the straight line P represents the spectrum of the previous frame between two consecutive frames. Furthermore, the dashed line C represents the spectrum of the current frame between two consecutive frames.

The correlation coefficient of the spectrum between two frames illustrated in FIG. 3A is assumed to be 0.84, and the correlation coefficient of the spectrum between two frames illustrated in FIG. 3B is assumed to be −0.09. As described above, in the vowel section, since the spectrum tends to slowly change comparatively, which is unique to voice, over a plurality of frames, the shapes of the spectra of two consecutive frames have a high correlation. Therefore, the correlation coefficient becomes a high value as 0.84. In comparison, in the stationary noise section, since sound arrives randomly from the surroundings, the spectral shape between two consecutive frames has a low correlation. Therefore, the correlation coefficient becomes close to 0.

In the present embodiment, a correlation between the previous frame and the current frame is obtained. Alternatively, a correlation coefficient with a frame, which is previous to two frames, may be used to detect a vowel section. The reason for this is that when the frame shift length is short, in the vowel section, the correlation coefficient with a frame, which is two frames before, is large. The case in which the frame shift length is short is a case in which, for example, the frame shift length is 5 or 10 ms. As described above, the frame used for the calculation of the correlation coefficient is not limited to the current frame and the immediately previous frame.

When the correlation coefficient is smaller than Th2 (Yes in Op8), the update determiner 8 determines the current frame to be a noise section. That is, the update determiner 8 determines that the noise model is updated using the current frame. When the correlation coefficient is greater than or equal to Th2 (No in Op8), the update determiner 8 determines that the noise model is not updated. That is, the update determiner 8 compares the correlation coefficient with the spectrum between the current frame and the previous frame, which is calculated in Op7, with the threshold value Th2.

When the correlation coefficient falls below the threshold value Th2, the update determiner 8 determines the section to be a stationary noise section, and when the correlation coefficient exceeds the threshold value Th2, the update determiner 8 determines the section to be a vowel section. For the correlation coefficient, the correlation calculator 6 may calculate the above-described Expression with regard to a plurality of frequency bands, and the update determiner 8 may compare the correlation coefficient with the threshold value Th2 for each frequency band. The threshold value may also be provided for each frequency band. The update of the noise model may be performed in accordance with the set time constant with regard to the frequency band that has been determined to be a stationary noise section.

When Yes in Op8, the updater 9 updates the noise model using the time constant that is determined in Op5 or Op6 by using the spectrum of the frame that has been determined to be a stationary noise section (Op9). For example, when the time constant is α, the updater 9 updates the noise model model(ω) at the frequency w for each frequency by using Expression (3) below by using the value S(ω) of the power spectrum of the current frame. This process corresponds to that in which the noise model is averaged.

Equation 3

$$\text{model}(\omega) \Leftarrow \alpha \cdot \text{model}(\omega) + (1-\alpha) \cdot S(\omega) \tag{3}$$

The processes of Op1 to Op9 are repeated until the processing is completed for all the frames (Yes in Op10). That is, the processes of Op1 to Op9 are performed in sequence for each frame arranged in the time axis.

In the manner described above, in the embodiment illustrated in FIG. 2, the threshold value when a determination is made as to the presence or absence of the update of the noise model by using the correlation coefficient, and the update degree of the noise model are controlled in accordance with the value of the current frame power calculated in Op3.

Therefore, in the present embodiment, it is possible to suppress an influence of a vowel section on the noise model.

Furthermore, in the embodiment, the detection of a vowel section using a correlation coefficient of a spectrum is simply used for the estimation of the noise model, and also, the threshold value for determining whether or not the noise model update is performed and the update degree of the noise model are switched using the current frame power. This is based on the knowledge that an optimal threshold value and the update degree of an optimal noise model differ depending on the value of the current frame power.

With the method of switching between the threshold values and the noise model updating processes by using the estimated value of the noise model and the difference between the input sound and the noise model, noise will be estimated using the estimated value. Therefore, this method may not guarantee stable operation. On the other hand, by using the absolute magnitude of the current frame power as in the above-described embodiment, a stable noise estimation process independent of an estimation process result becomes possible.

Modifications

Figure 4A:
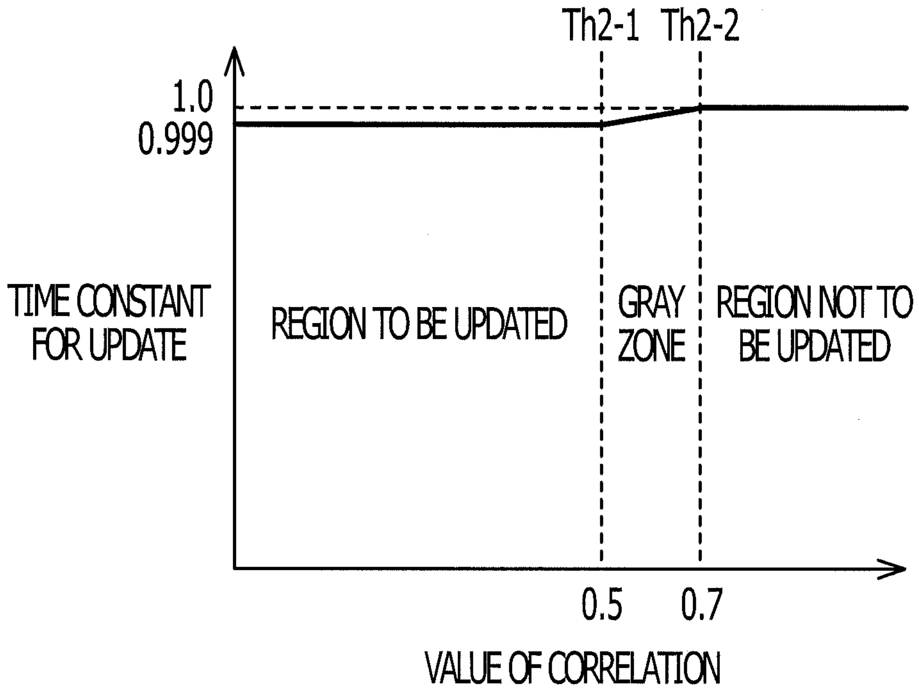
FIG. 4A is an illustration illustrating a modification of calculation of an update degree at a time of low frame power.
Figure 4B:
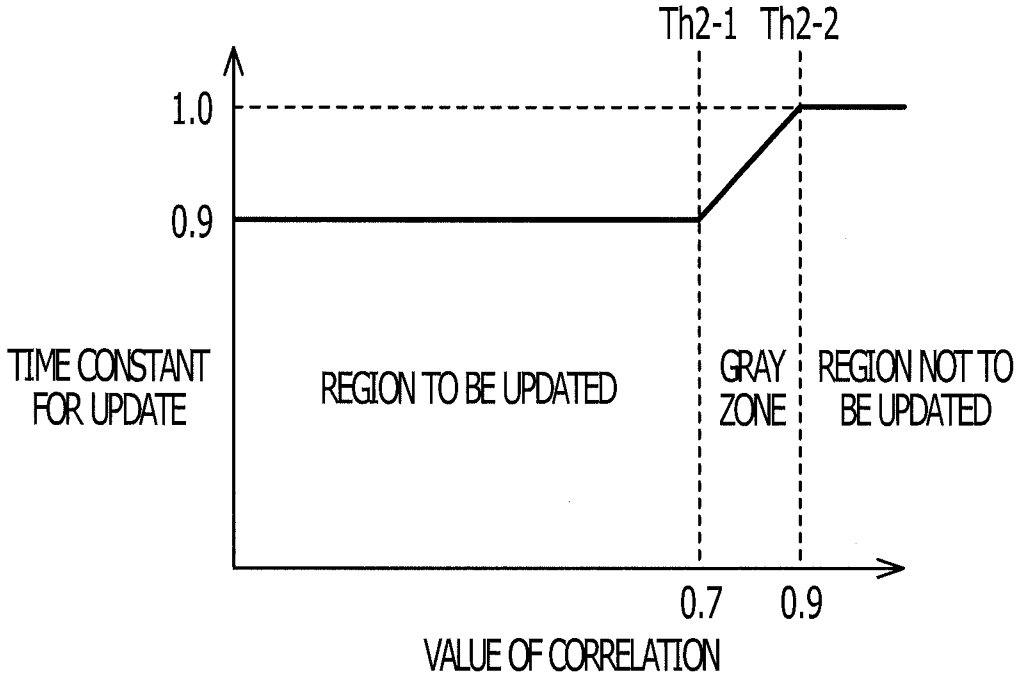
FIG. 4B is an illustration illustrating a modification of calculation of an update degree at a time of high frame power.

FIGS. 4A and 4B each illustrate a modification of calculations of an update degree made by the update determiner 8. FIG. 4A illustrates an example of the relation between a correlation coefficient and a time constant at a time of low frame power. FIG. 4B illustrates an example of the relation between a correlation coefficient and a time constant at a time of high frame power. In the examples illustrated in FIGS. 4A and 4B, it is assumed that two threshold values are set for a correlation coefficient. The smaller of the two threshold values is denoted as Th2-1, and the larger of them is denoted as Th2-2. When the correlation coefficient is greater than or equal to the threshold value Th2-2, the update determiner 8 sets the time constant for an update to 1.0. That is, the update determiner 8 stops the update of the noise model.

On the other hand, when the correlation coefficient is smaller than or equal to the threshold value Th2-1, the time constant is set to 0.999. In addition, when the correlation coefficient is between the threshold value Th2-1 and the threshold value Th2-2, the update determiner 8 determines the time constant so that the time constant of the update is increased continuously in response to the value of the correlation coefficient. According to the present embodiment, a gray zone may be provided.

Furthermore, when the correlation coefficient is a value in a range in which an update is not performed, the update determiner 8 may forcibly set the time constant of the update to 1.0 even if, for example, the value of the correlation coefficient falls below the threshold value Th2-2 in the succeeding six frames. As a result, when the update determiner 8 determines that the update of the noise model is unnecessary, it is possible to prevent the updater 9 from updating the noise model with regard to frames within a certain time period from the target frame.

That is, when the update determiner 8 determines that the current frame is a voice section by using the correlation coefficient, the update determiner 8 is able to forcibly use the update degree of the sound section so as to update the noise model over several frames at and subsequent to the current frame. As a result, it is possible to alleviate a voice section in which the likelihood of being a vowel section is difficult to appear, such as a glide between a phoneme and a phoneme or a consonant section, from being used to update the noise model.

As described above, according to the present embodiment, as a result of providing a so-called guard frame, it is alleviated that a glide between different vowels, and a consonant are used by mistake for the update a noise model by considering them to be a stationary noise section. Regarding the glide between different vowels, and a consonant, the value of the correlation coefficient tends to decrease between the frames. The case of FIG. 4B is similar to the case of FIG. 4A. Th2-1 and Th2-2 in FIG. 4A are numerical values different from Th2-1 and Th2-2 in FIG. 4B.

Second Embodiment

Figure 5:
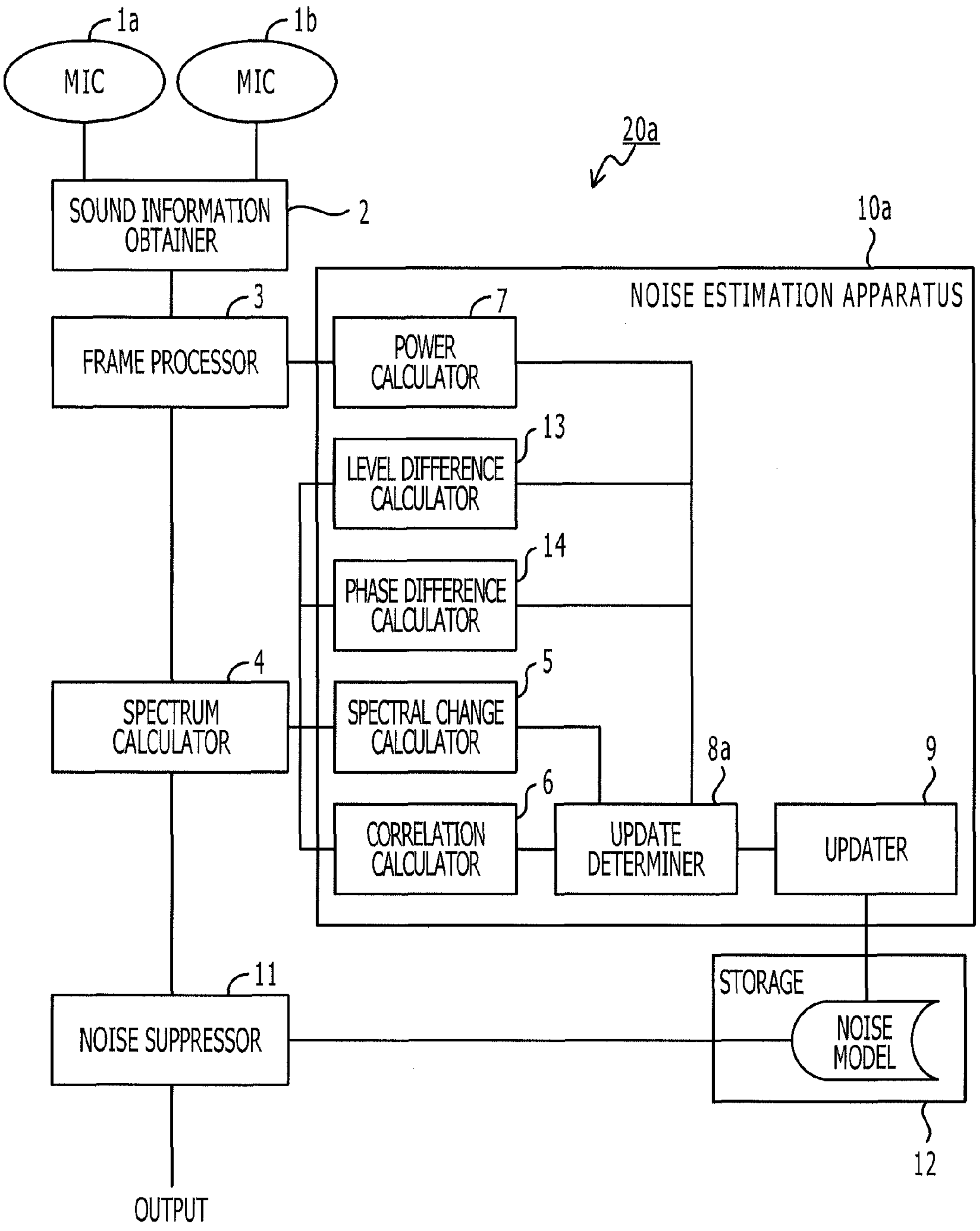
FIG. 5 is a functional block diagram illustrating the configuration of a noise suppression apparatus including a noise estimation apparatus according to a second embodiment of the present invention.

FIG. 5 is a functional block diagram illustrating the configuration of a noise suppression apparatus 20*a* including a noise estimation apparatus 10*a* according to a second embodiment of the present invention. Blocks in FIG. 5, which are the same as those in FIG. 1, are designated with the same reference numerals. The noise suppression apparatus 20*a* illustrated in FIG. 5 accepts sound information received by microphones 1*a* and 1*b*.

The forms of the microphones 1*a* and 1*b* are not limited to specific forms. Here, a description will be given of a case in which, as an example, the microphones 1*a* and 1*b* are formed of a microphone array in which these are installed at the front and the back side of a mobile phone. The sound information obtainer 2 receives analog signals received by the microphones 1*a* and 1*b*. The respective analog signals of the microphones 1*a* and 1*b* are each applied to an anti-aliasing filter. Then, each analog signal is converted into a digital signal. The frame processor 3 and the spectrum calculator 4 perform a conversion-to-frame process and a power spectrum calculation process on the respective digital signals in the same manner as in the first embodiment.

Example of Configuration of Noise Suppression Apparatus 20*a*

The noise estimation apparatus 10*a* further includes, in addition to the components of the noise estimation apparatus 10, a level difference calculator 13 that calculates a level difference between microphones based on sound information obtained by the microphones 1*a* and 1*b*. The level difference calculator 13 receives, for example, spectra of the respective channels of the microphones 1*a* and 1*b* from the spectrum calculator 4.

The level difference calculator 13 calculates the power spectrum of each frame with regard to each of the channels. As a result, it is possible for the level difference calculator 13 to calculate the sound level for each frame with regard to the channel of each of the microphones 1*a* and 1*b*. The level difference calculator 13 calculates the difference between the sound level of the channel of the microphone 1*a* and the sound level of the channel of the microphone 1*b* for each frame and for each frequency, thereby calculating the level difference between channels of microphones for each frame and for each frequency.

Alternatively, it is also possible for the level difference calculator 13 to calculate the level of the sound of the entire band for each frame based on the waveform signal of the sound information in the channel of each of the microphones 1*a* and 1*b*. The entire band is 0 to 4 kHz for, for example, 8 kHz sampling. The level calculation of the sound of the frame is the same as the calculation of the power value of the current frame of the power calculator 7 in the first embodiment.

The update determiner 8*a* further uses the level difference calculated by the level difference calculator 13, and determines the update degree or whether or not the update of the noise model is performed. The level difference of the sounds received by two microphones represents the likelihood of the voice being uttered in the vicinity of a microphone. For example, based on the likelihood of being voice uttered in the vicinity of a microphone, the update determiner 8*a* is able to control the update speed of the noise model.

Specifically, the update determiner 8*a* determines a section in which the level difference between two microphones is greater than a threshold value to be a section of a voice uttered in the vicinity of a microphone. Then, the update determiner 8*a* appropriately controls the time constant indicating the degree of the noise model update. For this reason, it may be alleviated that components of a voice are included in the noise model.

The noise estimation apparatus 10*a* further includes a phase difference calculator 14 that calculates the phase difference between microphones based on the sound information obtained by the microphones 1*a* and 1*b*. The phase difference calculator 14 receives the complex spectrum of the channel of each of the microphones 1*a* and 1*b* from the spectrum calculator 4. The phase difference calculator 14 calculates the phase difference between the complex spectrum of the channel of the microphone 1*a* and the complex spectrum of the channel of the microphone 1*b* for each frame and for each frequency. As a result, the phase difference calculator 14 is able to calculate the phase difference spectrum between the channels of the microphones 1*a* and 1*b*. It is possible to determine, for example, the direction of the arrival of sound based on the phase difference spectrum for each frequency. The arrival direction of the sound is the direction of the sound source.

By further using the phase difference calculated by the phase difference calculator 14, the update determiner 8*a* determines the update degree and whether or not the update of the noise model is performed. The update determiner 8*a* determines, for example, the likelihood of being a voice uttered in the direction of the mouth of a user based on the phase difference. Then, the update determiner 8*a* controls the update degree of the noise model based on the likelihood of being a voice uttered in the direction of the mouth of the user.

As described above, the update determiner 8*a* appropriately controls the time constant of the update of the noise model based on the likelihood of being a voice, which is obtained from the phase difference between two microphones. Therefore, it may be alleviated that sound components uttered in the direction of the mouth of the user are reflected in the noise model.

In the example illustrated in FIG. 5, the level difference calculator 13 and the phase difference calculator 14 receive spectra of the channels of both the microphone 1*a* and the microphone 1*b*. In contrast, the power calculator 7, the spectral change calculator 5, the correlation calculator 6, and the noise suppressor 11 may receive the spectrum of the channel of one of the microphone 1*a* and the microphone 1*b* and perform processing thereon. For example, for a mobile phone, typically the signal of the channel of the microphone, which is provided closer to the mouth of the user among the microphone 1*a* and the microphone 1*b*, is used by the power calculator 7, the spectral change calculator 5, the correlation calculator 6, and the noise suppressor 11.

In the example illustrated in FIG. 5, the noise estimation apparatus 10*a* includes both the level difference calculator 13 and the phase difference calculator 14. Alternatively, the noise estimation apparatus 10*a* may include at least one of them. Furthermore, in response to the power value calculated by the power calculator 7, the update determiner 8*a* may switch between a case in which both the level difference and the phase difference are used to determine the update degree and whether or not the update is performed and a case in which one of them is used.

As a consequence, for example, in accordance with the current frame power value, it becomes possible to switch whether to use, for the control of the update degree of the noise model, the information on the likelihood of being a voice uttered in the surroundings and the information on the likelihood of being a voice uttered in the direction of the mouth of the user. As a result, at each of a time of low frame power and a time of the high frame power, the update of an optimal noise model becomes possible. Consequently, it is possible to stably estimate the noise model.

Example of Operation of Noise Estimation Apparatus 10*a*

Figure 6:
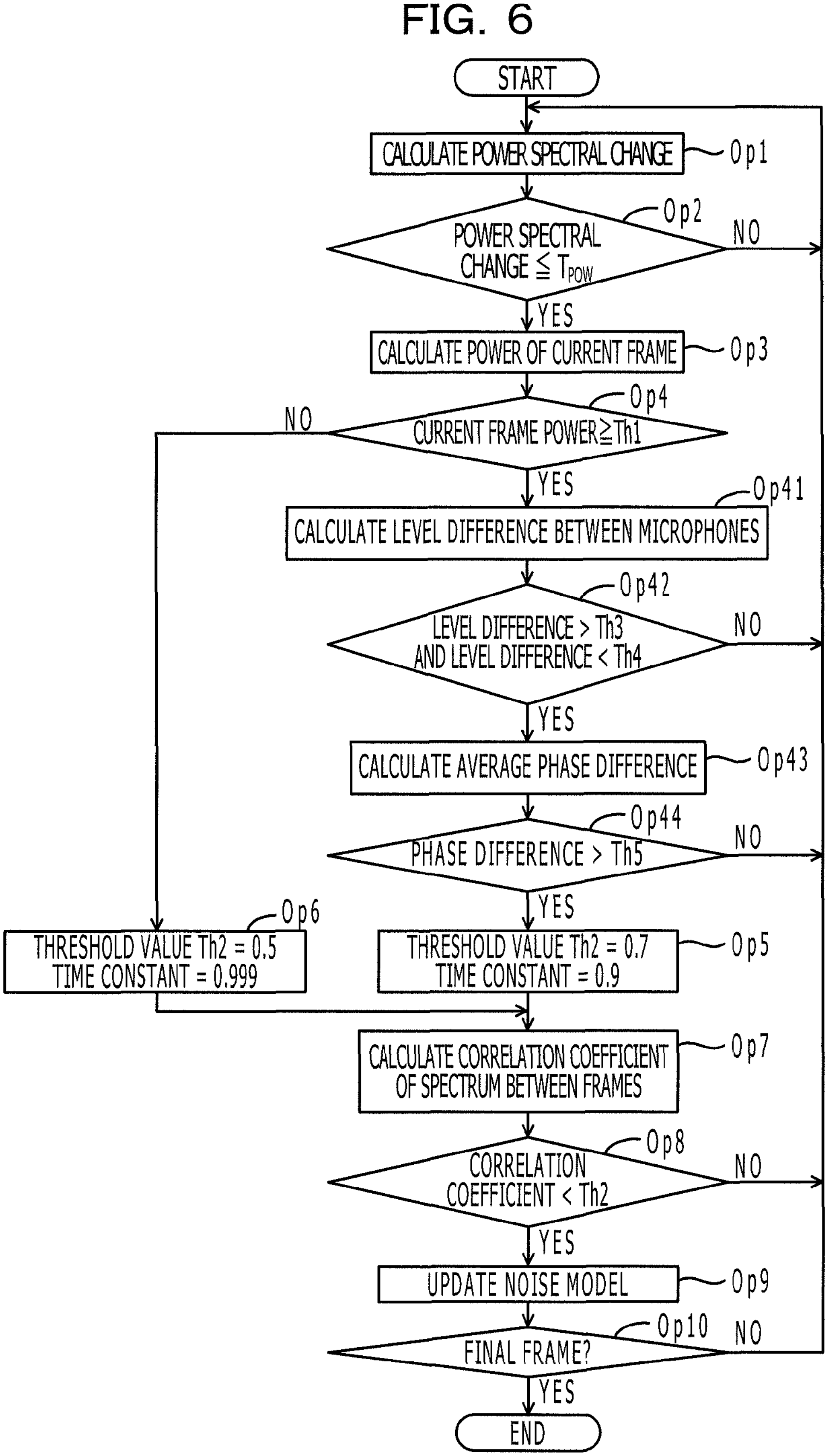
FIG. 6 is a flowchart illustrating an example of the operation of a noise estimation apparatus.

FIG. 6 is a flowchart illustrating an example of the operation of the noise estimation apparatus 10*a*. Processes in FIG. 6, which are the same as the processes illustrated in FIG. 2, are designated with the same reference numerals. The operation illustrated in FIG. 6 is such that the user's voice detection process (Op41 to Op44) at the time of the high frame power (when Yes in Op4) is added to the operation of the first embodiment illustrated in FIG. 2.

In the example illustrated in FIG. 6, when the current frame power is smaller than or equal to the threshold value Th1, the level difference calculator 13 calculates the level difference between sounds of microphones (Op41). Then, the update determiner 8*a* makes a judgment as to the likelihood of being a voice section of the current frame by using the information on the level difference between two microphones (Op42).

For example, when the user makes an utterance in the vicinity of a microphone, a difference occurs between the level of the microphone closer to the mouth and the level of the microphone distant from the mouth. In Op42, if there is a level difference between the two microphones, the update determiner 8*a* determines that the spectrum of the current frame is that of the frame of the sound generated nearby, and does not use it to update the noise model.

Specifically, when the difference between the sound level of the current frame of the channel of the microphone 1*a* and the sound level of the current frame of the channel of the microphone 1*b* is greater than a threshold value Th3 and smaller than a threshold value Th4 (when Yes in Op42), the update determiner 8*a* determines that the current frame is not a voice section.

When No in Op42, the update determiner 8*a* determines that the current frame is a voice section. That is, the current frame is not used to update the noise model. Here, the two threshold values Th3 and Th4 are in a relation of Th3<Th4. For example, Th3 may be made to be a threshold value for determining whether or not the current frame is a voice section made by utterance in the vicinity of a microphone in the front, and Th4 may be made to be a threshold value for determining whether or not the current frame is a voice section made by an utterance in the vicinity of a microphone in the back.

When Yes in Op42, the phase difference calculator 14 calculates the phase difference between the microphones (Op43). The update determiner 8*a* makes a judgment as to the likelihood of being a voice section of the current frame by using the information on the phase difference between two microphones (Op44).

Based on the operations of Op43 and Op44, for example, when the arrival direction of the sound, which is estimated from the phase difference between the respective channels of the microphones 1*a* and 1*b*, is the direction of the mouth of the user, the update determiner 8*a* determines that the spectrum of the current frame is a user's voice. Then, the current frame is not used to update the noise model.

Specifically, when the average phase difference between the respective channels of the microphones 1*a* and 1*b* in the section including the current frame is greater than a threshold value Th5 (when Yes in Op44), it is determined that there is a probability that the current frame is a noise section. A process for updating the noise model (Op5 and later) is performed. When No in Op44, the current frame is determined to be a voice section, and the update of the noise model in the current frame is not performed. For example, Th5 may be made to be a threshold value for detecting an utterance from the front side of the user.

In the example illustrated in FIG. 6, at the time of the low frame power (when No in Op4), the user's voice detection process (Op41 to Op44) based on the information on the level difference and the phase difference between two microphones is not performed. Since the user's voice at the time of the low frame power is a low power voice, SNR is poor, and the level difference and the phase difference become easily disturbed. Therefore, it is possible to prevent the state from entering a state in which user's voice may not be stably detected.

In addition, in the example illustrated in FIG. 6, the level difference spectrum and the phase difference spectrum are obtained for each frequency. For this reason, the level difference spectrum and the phase difference spectrum may be compared with the threshold values Th3, Th4, and Th5 for each frequency, and it may be determined whether or not the noise model is updated for each frequency.

As described above, according to the present embodiment, the phase difference that indicates the direction of the mouth of the user and the level difference that indicates the distance between the microphone and the mouth, which are based on the sound information from the two microphones, may be used to make a determination as to the sound section. As a result, it may be alleviated that the user's voice components are used to update the noise model. The number of microphones is not limited to two. Also, in a configuration in which there are three or more microphones, similarly, a sound level difference and a phase difference between microphones may be calculated and may be used for the update control of the noise model.

Computer Configuration, and Others

The noise suppression apparatuses 20 and 20*a* and the noise estimation apparatuses 10 and 10*a* in the first and second embodiments may be embodied by using computers. Computers forming the noise suppression apparatuses 20 and 20*a* and the noise estimation apparatuses 10 and 10*a* include at least a processor, such as a CPU or a digital signal processor (DSP), and memories, such as a ROM and a RAM.

The functions of the sound information obtainer 2, the frame processor 3, the spectrum calculator 4, the noise estimation apparatus 10, the noise suppressor 11, the spectral change calculator 5, the correlation calculator 6, the power calculator 7, the update determiners 8 and 8*a*, and the updater 9, the level difference calculator 13, and the phase difference calculator 14 may also be implemented by executing programs recorded in a memory by the CPU. Furthermore, the functions may also be implemented by one or more DSPs in which programs and various data are incorporated. The storage 12 may be realized by a memory that may be accessed by the noise suppression apparatuses 20 and 20*a*.

A computer-readable program for causing a computer to perform these functions, and a storage medium on which the program is recorded are included in the embodiment of the present invention. This storage medium is non-transitory, and does not include a transitory medium, such as a signal itself.

An electronic apparatus, such as a mobile phone or a car navigation system, in which the noise suppression apparatuses 20 and 20*a* and the noise estimation apparatuses 10 and 10*a* are incorporated, is included in the embodiment of the present invention.

According to the first and second embodiments, discrimination is made as to a vowel section and a low voice section for which discrimination is difficult with typically the technique using a temporal change in spectrum, and the vowel section and the low power voice section are not used to update the noise model. As a consequence, it is possible to alleviate processed sound from being distorted due to a noise suppression process using a noise model.

Although a few preferred embodiments of the present invention have been shown and described, it would be appreciated by those skilled in the art that changes may be made in these embodiments without departing from the principles and spirit of the invention, the scope of which is defined in the claims and their equivalents.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A noise estimation apparatus comprising:

a correlation calculator configured to calculate an absolute correlation value of a spectrum between a plurality of frames in sound information obtained using one or more microphones, the correlation value indicating a degree of correlation of the spectrum between the plurality of frames;

a power calculator configured to calculate a sound power of one target frame among the plurality of frames;

an update determiner configured to determine a time constant indicating a degree to which the sound information of the target frame is to be reflected in a noise model stored in a storage, and determine whether the noise model is to be updated to an other noise model, based on the sound power of the target frame and the correlation value, set a predetermined value to the time constant when the sound power is equal to or greater than a predetermined threshold value, and set a larger value than the predetermined value to the time constant when the sound power is smaller than the predetermined threshold value; and an updater configured to generate the other noise model based on a determined result by the update determiner, the sound information of the target frame, and the noise model.

2. The noise estimation apparatus according to claim 1, further comprising a level difference calculator configured to calculate a level difference between a plurality of pieces of sound information based on the plurality of pieces of sound information obtained using a plurality of microphones, wherein the update determiner determines the time constant or whether the noise model is updated to the other noise model by using the level difference.

3. The noise estimation apparatus according to claim 2, wherein the updater generates the other noise model when the level difference is smaller than a threshold value.

4. The noise estimation apparatus according to claim 2, further comprising a phase difference calculator configured to calculate a phase difference between the plurality of pieces of sound information based on the plurality of pieces of sound information obtained using the plurality of microphones, wherein the update determiner determines the time constant, or whether the noise model is updated to the other noise model by using the phase difference.

5. The noise estimation apparatus according to claim 1, further comprising a phase difference calculator configured to calculate a phase difference between a plurality of pieces of sound information based on the plurality of pieces of sound information obtained using the plurality of microphones, wherein the update determiner determines the time constant, or whether the noise model is updated to the other noise model by using the phase difference.

6. The noise estimation apparatus according to claim 5, wherein the updater generates the other noise model when an arrival direction of sound based on the phase difference is greater than a threshold value.

7. The noise estimation apparatus according to claim 1, wherein the updater generates the other noise model when the correlation value is smaller than a threshold value.

8. The noise estimation apparatus according to claim 7, wherein the update determiner determines the threshold value based on a comparison between a magnitude of the sound power of the target frame and another threshold value.

9. The noise estimation apparatus according to claim 7, wherein the threshold value includes a first value and a second value greater than the first value, and wherein the update determiner determines the time constant, or whether the noise model is updated to the other noise model based on the correlation value and a comparison between the first value and the second value.

10. The noise estimation apparatus according to claim 9, wherein the update determiner sets the time constant to a first time constant when the correlation value is smaller than or equal to the first value, sets the time constant to a second time constant when the correlation value is greater than the second value, and sets the time constant to a third time constant when the correlation value is between the first value and the second value, and wherein the updater generates the other noise model by using any one of the first time constant, the second time constant, and the third time constant.

11. The noise estimation apparatus according to claim 1, wherein the update determiner determines the time constant based on a comparison between the sound power of the target frame and a threshold value.

12. The noise estimation apparatus according to claim 11, wherein the update determiner sets the time constant to a first value when the magnitude of the sound power is greater than the threshold value, and sets the time constant to be a second value indicating that the time constant is smaller than the first value when the magnitude of the sound power is smaller than threshold value.

13. The noise estimation apparatus according to claim 12, wherein the update determiner sets another threshold value to a first value when the magnitude of the sound power is greater than the threshold value, and sets the another threshold value to a second value when the magnitude of the sound power is smaller than the threshold value, and wherein the updater generates the other noise model when the correlation value is greater than the another threshold value.

14. The noise estimation apparatus according to claim 1, wherein the update determiner calculates a time average mean value as the time constant.

15. The noise estimation apparatus according to claim 1, wherein when the update determiner determines that the noise model is not updated by using the sound information of the target frame, the updater does not generate the other noise model using the sound information of a frame within a certain time period from the target frame.

16. The noise estimation apparatus according to claim 1, wherein the sound power comprises a power spectrum.

17. The noise estimation apparatus according to claim 1, wherein the power calculator is configured to calculate the sound power by summing squares of sample values in the one target frame.

18. A noise estimation method executed by a computer, comprising:

calculating an absolute correlation value of a spectrum between a plurality of frames in sound information obtained using one or more microphones, the correlation value indicating a degree of correlation of the spectrum between the plurality of frames;

calculating a sound power of one target frame among the plurality of frames;

determining a time constant indicating a degree to which the sound information of the target frame is to be reflected in a noise model stored in a storage, and whether a noise model is to be updated to an other noise model based on the sound power of the target frame and the correlation value, setting a predetermined value to the time constant when the sound power is equal to or greater than a predetermined threshold value, and setting a larger value than the predetermined value to the time constant when the sound power is smaller than the predetermined threshold value; and generating the other noise model based on a determined result by the determining, the sound information of the target frame, and the noise model.

19. The noise estimation method according to claim 18, further comprising calculating a level difference between a plurality of pieces of sound information based on the plurality of pieces of sound information obtained using a plurality of microphones, wherein in the determining, the time constant or whether the noise model is to be updated to the other noise model is determined by using the level difference.

20. The noise estimation method according to claim 18, further comprising calculating the sound power by summing squares of sample values in the one target frame.

21. A non-transitory storage medium storing a noise estimation program causing a computer to execute:

calculating an absolute correlation value of a spectrum between a plurality of frames in sound information obtained using one or more microphones, the correlation value indicating a degree of correlation of the spectrum between the plurality of frames;

calculating a sound power of one target frame among the plurality of frames;

determining a time constant indicating a degree to which the sound information of the target frame is to be reflected in a noise model stored in a storage, and whether a noise model is to be updated to an other noise model based on the sound power of the target frame and the correlation value, setting a predetermined value to the time constant when the sound power is equal to or greater than a predetermined threshold value, and setting a larger value than the predetermined value to the time constant when the sound power is smaller than the predetermined threshold value; and generating the other noise model based on a determined result by the determining, the sound information of the target frame, and the noise model.

22. The noise estimation program according to claim 21, further comprising calculating a level difference between a plurality of pieces of sound information based on the plurality of pieces of sound information obtained using a plurality of microphones, wherein in the determining, the time constant or whether the noise model is to be updated to the other noise model is determined by using the level difference.

23. The noise estimation program according to claim 21, further comprising calculating the sound power by summing squares of sample values in the one target frame.

* * * * *